United States Patent
Kashibuchi et al.

(10) Patent No.: US 8,711,433 B2
(45) Date of Patent: Apr. 29, 2014

(54) IMAGE FORMING APPARATUS AND METHOD FOR MAKING DENSITY CORRECTION IN A LOW RESOLUTION IMAGE BASED ON EDGE DETERMINATION

(75) Inventors: Yoichi Kashibuchi, Tokyo (JP); Hiroshi Kaburagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 944 days.

(21) Appl. No.: 12/504,616

(22) Filed: Jul. 16, 2009

(65) Prior Publication Data
US 2010/0039672 A1 Feb. 18, 2010

(30) Foreign Application Priority Data
Aug. 13, 2008 (JP) ................................. 2008-208597

(51) Int. Cl.
*G06K 15/00* (2006.01)
(52) U.S. Cl.
USPC ........... 358/2.1; 358/3.27; 358/1.9; 358/3.15; 382/199; 382/240
(58) Field of Classification Search
None
See application file for complete search history.

(56) References Cited

U.S. PATENT DOCUMENTS

| | | | | |
|---|---|---|---|---|
| 4,873,577 A * | 10/1989 | Chamzas | ...................... | 382/240 |
| 6,690,724 B1 * | 2/2004 | Kadono | ................... | 375/240.01 |
| 6,934,057 B1 * | 8/2005 | Namizuka | ...................... | 358/2.1 |
| 7,099,045 B2 * | 8/2006 | Nabeshima | ..................... | 358/2.1 |
| 7,206,446 B2 * | 4/2007 | Sawada | ......................... | 382/167 |
| 7,339,701 B2 * | 3/2008 | McElvain | ...................... | 358/1.9 |
| 7,375,843 B2 | 5/2008 | Kaburagi | | |
| 7,532,762 B2 * | 5/2009 | Sekiguchi et al. | ............. | 382/233 |
| 8,035,705 B2 * | 10/2011 | Tsuruoka | ...................... | 348/252 |
| 8,335,403 B2 * | 12/2012 | Dai et al. | ...................... | 382/299 |
| 2002/0080377 A1 * | 6/2002 | Tonami et al. | ................. | 358/1.9 |
| 2007/0160301 A1 * | 7/2007 | Wang et al. | ................... | 382/240 |
| 2008/0310758 A1 | 12/2008 | Kashibuchi | | |
| 2009/0324090 A1 * | 12/2009 | Tanaka | .......................... | 382/199 |
| 2010/0040291 A1 * | 2/2010 | Genda et al. | .................. | 382/199 |
| 2010/0097495 A1 * | 4/2010 | Choe et al. | .................... | 348/235 |
| 2013/0177242 A1 * | 7/2013 | Adams et al. | ................. | 382/167 |

FOREIGN PATENT DOCUMENTS

| | | |
|---|---|---|
| JP | 04-336859 | 11/1992 |
| JP | 2001-136370 A | 5/2001 |
| JP | 2001136370 A * | 5/2001 |
| JP | 2004-201283 | 7/2004 |

OTHER PUBLICATIONS

Japanese Office Action dated May 15, 2012 in Japanese Patent Application No. 2008-208597.

* cited by examiner

*Primary Examiner* — Dung Tran
(74) *Attorney, Agent, or Firm* — Fitzpatrick, Cella, Harper & Scinto

(57) ABSTRACT

The image forming apparatus comprises a resolution converting unit configured to convert a high-resolution image data into a low-resolution image data, an edge judgment unit configured to judge a shape of an edge in the high-resolution image data, and a density correcting unit configured to make a density correction in the low-resolution image data in accordance with the shape of the edge judged by the edge judgment unit.

7 Claims, 20 Drawing Sheets

FIG.9

901 EDGE No.0
| 0 | 0 | 1 |
|---|---|---|
| 0 | 0 | 0 |
| 0 | 0 | 0 |

902 EDGE No.1
| 0 | 1 | 1 |
|---|---|---|
| 0 | 1 | 1 |
| 0 | 0 | 0 |

903 EDGE No.2
| 0 | 1 | 1 |
|---|---|---|
| 0 | 1 | 1 |
| 0 | 1 | 1 |

904 EDGE No.3
| 1 | 1 | 1 |
|---|---|---|
| 1 | 1 | 1 |
| 0 | 1 | 1 |

905 EDGE No.4
| 1 | 0 | 0 |
|---|---|---|
| 0 | 0 | 0 |
| 0 | 0 | 0 |

906 EDGE No.5
| 1 | 1 | 0 |
|---|---|---|
| 1 | 1 | 0 |
| 0 | 0 | 0 |

907 EDGE No.6
| 1 | 1 | 1 |
|---|---|---|
| 1 | 1 | 1 |
| 0 | 0 | 0 |

908 EDGE No.7
| 1 | 1 | 1 |
|---|---|---|
| 1 | 1 | 1 |
| 1 | 1 | 0 |

909 EDGE No.8
| 0 | 0 | 0 |
|---|---|---|
| 0 | 0 | 0 |
| 1 | 0 | 0 |

910 EDGE No.9
| 0 | 0 | 0 |
|---|---|---|
| 1 | 1 | 0 |
| 1 | 1 | 0 |

911 EDGE No.10
| 1 | 1 | 0 |
|---|---|---|
| 1 | 1 | 0 |
| 1 | 1 | 0 |

912 EDGE No.11
| 1 | 1 | 0 |
|---|---|---|
| 1 | 1 | 1 |
| 1 | 1 | 1 |

913 EDGE No.12
| 0 | 0 | 0 |
|---|---|---|
| 0 | 0 | 0 |
| 0 | 0 | 1 |

914 EDGE No.13
| 0 | 0 | 0 |
|---|---|---|
| 0 | 1 | 1 |
| 0 | 1 | 1 |

915 EDGE No.14
| 0 | 0 | 0 |
|---|---|---|
| 1 | 1 | 1 |
| 1 | 1 | 1 |

916 EDGE No.15
| 0 | 1 | 1 |
|---|---|---|
| 1 | 1 | 1 |
| 1 | 1 | 1 |

FIG.10

| 1001 EDGE No.0 | | 1002 EDGE No.1 | | 1003 EDGE No.2 | | 1004 EDGE No.3 | |
|---|---|---|---|---|---|---|---|
| Input | Output | Input | Output | Input | Output | Input | Output |
| 0 | 0 | 0 | 0 | 0 | 0 | 0 | 0 |
| 1 | 4 | 1 | 3 | 1 | 2 | 1 | 1 |
| 2 | 8 | 2 | 6 | 2 | 4 | 2 | 2 |
| ⋮ | ⋮ | ⋮ | ⋮ | ⋮ | ⋮ | ⋮ | ⋮ |
| 254 | 255 | 254 | 254 | 254 | 254 | 254 | 254 |
| 255 | 255 | 255 | 255 | 255 | 255 | 255 | 255 |

| 1005 EDGE No.4 | | 1006 EDGE No.5 | | 1007 EDGE No.6 | | 1008 EDGE No.7 | |
|---|---|---|---|---|---|---|---|
| Input | Output | Input | Output | Input | Output | Input | Output |
| 0 | 0 | 0 | 0 | 0 | 0 | 0 | 0 |
| 1 | 1 | 1 | 1 | 1 | 1 | 1 | 1 |
| 2 | 2 | 2 | 2 | 2 | 2 | 2 | 2 |
| ⋮ | ⋮ | ⋮ | ⋮ | ⋮ | ⋮ | ⋮ | ⋮ |
| 254 | 254 | 254 | 254 | 254 | 254 | 254 | 254 |
| 255 | 255 | 255 | 255 | 255 | 255 | 255 | 255 |

| 1009 EDGE No.8 | | 1010 EDGE No.9 | | 1011 EDGE No.10 | | 1012 EDGE No.11 | |
|---|---|---|---|---|---|---|---|
| Input | Output | Input | Output | Input | Output | Input | Output |
| 0 | 0 | 0 | 0 | 0 | 0 | 0 | 0 |
| 1 | 1 | 1 | 1 | 1 | 1 | 1 | 1 |
| 2 | 2 | 2 | 2 | 2 | 2 | 2 | 2 |
| ⋮ | ⋮ | ⋮ | ⋮ | ⋮ | ⋮ | ⋮ | ⋮ |
| 254 | 254 | 254 | 254 | 254 | 254 | 254 | 254 |
| 255 | 255 | 255 | 255 | 255 | 255 | 255 | 255 |

| 1013 EDGE No.12 | | 1014 EDGE No.13 | | 1015 EDGE No.14 | | 1016 EDGE No.15 | |
|---|---|---|---|---|---|---|---|
| Input | Output | Input | Output | Input | Output | Input | Output |
| 0 | 0 | 0 | 0 | 0 | 0 | 0 | 0 |
| 1 | 4 | 1 | 3 | 1 | 2 | 1 | 1 |
| 2 | 8 | 2 | 6 | 2 | 4 | 2 | 2 |
| ⋮ | ⋮ | ⋮ | ⋮ | ⋮ | ⋮ | ⋮ | ⋮ |
| 254 | 255 | 254 | 254 | 254 | 254 | 254 | 254 |
| 255 | 255 | 255 | 255 | 255 | 255 | 255 | 255 |

| 1801 EDGE No.0 | | 1802 EDGE No.1 | | 1803 EDGE No.2 | |
|---|---|---|---|---|---|
| Input | Output | Input | Output | Input | Output |
| 0 | 0 | 0 | 0 | 0 | 0 |
| 1 | 4 | 1 | 3 | 1 | 2 |
| 2 | 8 | 2 | 6 | 2 | 4 |
| ⋮ | ⋮ | ⋮ | ⋮ | ⋮ | ⋮ |
| 254 | 255 | 254 | 254 | 254 | 254 |
| 255 | 255 | 255 | 255 | 255 | 255 |

| 1804 EDGE No.3 | | 1805 EDGE No.4 | | 1806 EDGE No.5 | |
|---|---|---|---|---|---|
| Input | Output | Input | Output | Input | Output |
| 0 | 0 | 0 | 0 | 0 | 0 |
| 1 | 1 | 1 | 1 | 1 | 1 |
| 2 | 2 | 2 | 2 | 2 | 2 |
| ⋮ | ⋮ | ⋮ | ⋮ | ⋮ | ⋮ |
| 254 | 254 | 254 | 254 | 254 | 254 |
| 255 | 255 | 255 | 255 | 255 | 255 |

| 1807 EDGE No.6 | | 1808 EDGE No.7 | | 1809 EDGE No.8 | |
|---|---|---|---|---|---|
| Input | Output | Input | Output | Input | Output |
| 0 | 0 | 0 | 0 | 0 | 0 |
| 1 | 1 | 1 | 1 | 1 | 1 |
| 2 | 2 | 2 | 2 | 2 | 2 |
| ⋮ | ⋮ | ⋮ | ⋮ | ⋮ | ⋮ |
| 254 | 254 | 254 | 254 | 254 | 254 |
| 255 | 255 | 255 | 255 | 255 | 255 |

| 1810 EDGE No.9 | | 1811 EDGE No.10 | | 1812 EDGE No.11 | |
|---|---|---|---|---|---|
| Input | Output | Input | Output | Input | Output |
| 0 | 0 | 0 | 0 | 0 | 0 |
| 1 | 4 | 1 | 3 | 1 | 2 |
| 2 | 8 | 2 | 6 | 2 | 4 |
| ⋮ | ⋮ | ⋮ | ⋮ | ⋮ | ⋮ |
| 254 | 255 | 254 | 254 | 254 | 254 |
| 255 | 255 | 255 | 255 | 255 | 255 |

FIG.18

2001
EDGE CORRECTION
TABLE No.0

| Input | Output |
|---|---|
| 0 | 0 |
| 1 | 4 |
| 2 | 8 |
| ⋮ | ⋮ |
| 254 | 255 |
| 255 | 255 |

2002
EDGE CORRECTION
TABLE No.1

| Input | Output |
|---|---|
| 0 | 0 |
| 1 | 3 |
| 2 | 6 |
| ⋮ | ⋮ |
| 254 | 254 |
| 255 | 255 |

2003
EDGE CORRECTION
TABLE No.2

| Input | Output |
|---|---|
| 0 | 0 |
| 1 | 2 |
| 2 | 4 |
| ⋮ | ⋮ |
| 254 | 254 |
| 255 | 255 |

2004
EDGE CORRECTION
TABLE No.3

| Input | Output |
|---|---|
| 0 | 0 |
| 1 | 1 |
| 2 | 2 |
| ⋮ | ⋮ |
| 254 | 254 |
| 255 | 255 |

FIG.20

| EDGE No. | EDGE CORRECTION TABLE No. |
|---|---|
| 0 | 0 |
| 1 | 1 |
| 2 | 2 |
| 3 | 3 |
| 4 | 3 |
| 5 | 3 |
| 6 | 3 |
| 7 | 3 |
| 8 | 3 |
| 9 | 3 |
| 10 | 3 |
| 11 | 3 |
| 12 | 0 |
| 13 | 1 |
| 14 | 2 |
| 15 | 3 |

IMAGE FORMING APPARATUS AND METHOD FOR MAKING DENSITY CORRECTION IN A LOW RESOLUTION IMAGE BASED ON EDGE DETERMINATION

BACKGROUND OF THE INVENTION

1. Field of the Invention

The present invention relates to an image forming apparatus, an image forming method and a program, which make a density correction for realizing a stable reproducibility of an image in pseudo high-resolution processing.

2. Description of the Related Art

In recent years, progress of a high-quality image in a printer is remarkable, and a high-resolution processing of an engine, a high speed of the processing unit accompanying the high-resolution processing and an increase in memory capacity have rapidly been progressed. However, since enormous costs are required for meeting all of them, several methods are at present proposed for achieving the high-quality image or the high speed and the low costs all together.

An example of a method conventionally performed in a printer of an electronic photo system includes a method where in a low-resolution printer engine, low-resolution image data are exposed on a photo conductor so as to overlap between dot pitches of each pixel (for example, refer to Japanese Patent Laid-Open No. H04-336859(1992). In consequence, latent images are formed so that the overlapped portions between the pixels become also effective pixels. This is called spot multiplexing for reproducing an image with a pseudo higher resolution than an actual resolution.

In the above conventional technology (for example, refer to Japanese Patent Laid-Open No. H04-336859(1992), rendering is made to a high-resolution image data, various types of image processing are performed to the high-resolution image data as it is, and thereafter, it is required to generate and print the low-resolution image data for printing. Therefore, an example of a method of realizing the spot multiplexing at low costs includes a method in which a high-resolution image data is converted into a low-resolution image data and thereafter, various types of image processing are performed to the low-resolution image data, and a pseudo high-resolution image data is reproduced using the spot multiplexing (for example, refer to Japanese Patent Laid-Open No. 2004-201283).

However, since the above spot multiplexing forms the latent image from the overlapping of the two adjacent exposure portions for reproducing one dot, there is a problem that the dot reproduction is unstable and is difficult to control as compared to the usual processing. In particular, it is difficult to reproduce a small character or a thin line, which may be reproduced in such a manner as to be blurred with a light density at best. Therefore, the reproduction stabilization has been achieved by making the density correction so as to increase the density of the character or the whole line, but the spot multiplexing has also an issue that the color appearance of the character or the line largely changes.

SUMMARY OF THE INVENTION

For solving the above problems, an image forming apparatus according to the present invention comprises a resolution converting unit configured to convert a high-resolution image data into a low-resolution image data, an edge judgment unit configured to judge a shape of an edge in the high-resolution image data, and a density correcting unit configured to make a density correction in the low-resolution image data in accordance with the shape of the edge judged by the edge judgment unit.

According to the present invention, since the density can be controlled locally to the edge of the low-resolution image, the density can be stably reproduced to the edge of the low-resolution image converted from the high-resolution image.

Further, since only the edge is defined as an object for the density correction as compared to the conventional method of making the density correction in such a manner as to increase the density of the character or the whole line, the density correction can be made to the edge which possibly disappears due to the resolution conversion without changing the color appearance of the character or the whole line.

Further features of the present invention will become apparent from the following description of exemplary embodiments (with reference to the attached drawings).

BRIEF DESCRIPTION OF THE DRAWINGS

FIG. 9 is a diagram showing an example of edge patterns according to the first embodiment;

FIG. 10 is a diagram showing an example of edge correction tables according to the first embodiment;

FIG. 18 is a diagram showing an example of edge correction tables according to the second embodiment;

FIG. 20 is a diagram showing an example of edge correction tables according to a third embodiment;

DESCRIPTION OF THE EMBODIMENTS

Hereinafter, best modes for carrying out the present invention will be explained with reference to the accompanying drawings.

<First Embodiment>

Figure 1:
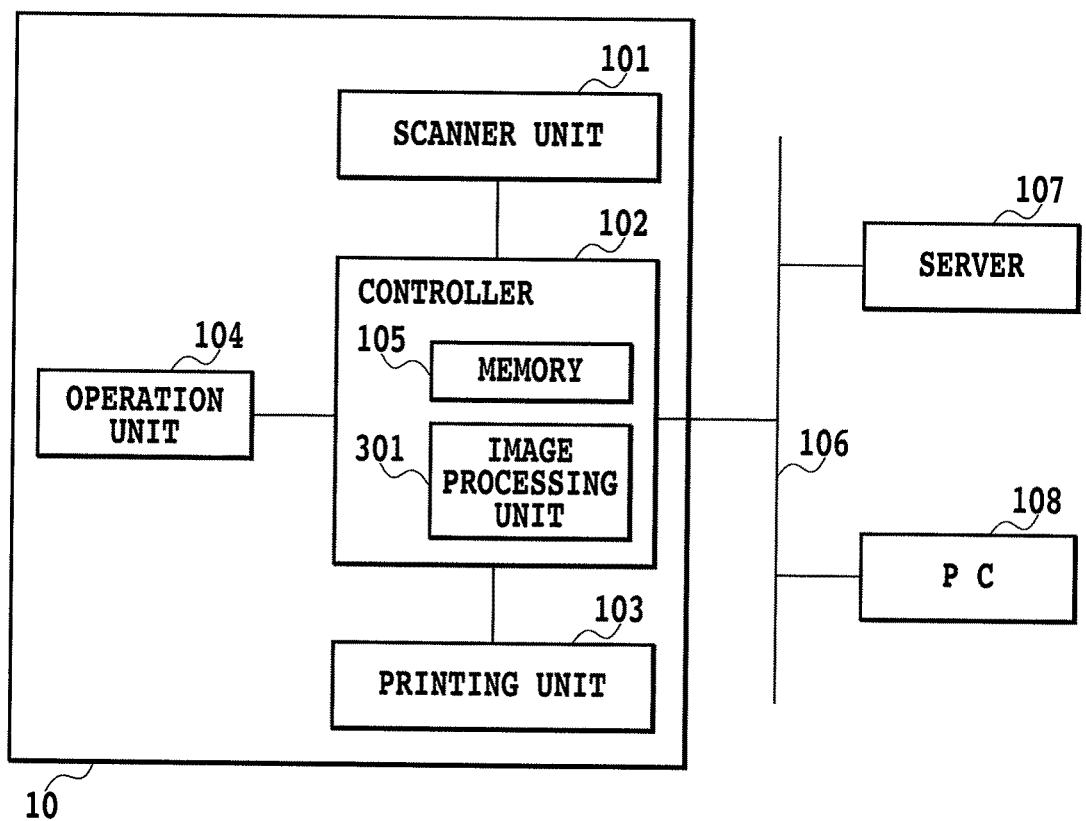
FIG. 1 is a schematic block diagram showing an image forming apparatus according to a first embodiment.

FIG. 1 is a schematic block diagram showing an image forming apparatus, and a block diagram showing a digital complex machine having general functions of copying, printing, faxing, and so on.

An image forming apparatus 10 in a first embodiment shown in FIG. 1 includes a scanner unit 101 for performing manuscript reading processing and a controller 102.

Here, an image processing unit 301 for performing image processing to an image data read from the scanner unit 101 and a memory 105 for storing data are stored in the controller 102.

The image forming apparatus 10 further includes an operation unit 104 for setting various printing conditions to the image data read from the scanner unit 101.

The image forming apparatus 10 includes a printing unit 103 for performing image formation of visualizing the image data read from the memory 105 on a print sheet according to a print setting condition set by the operation unit 104.

The image forming apparatus 10 is connected through a network 106 to a server 107 for managing the image data and a personal computer (PC) 108 for instructing execution of printing to the image forming apparatus 10.

Here, apparatuses other than the image forming apparatus 10, the server 107 and the PC 108 may be connected to the network 106.

In FIG. 1, the scanner unit 101, the printing unit 103, the operation unit 104 and the network 106 are connected to the controller 102.

Figure 2:
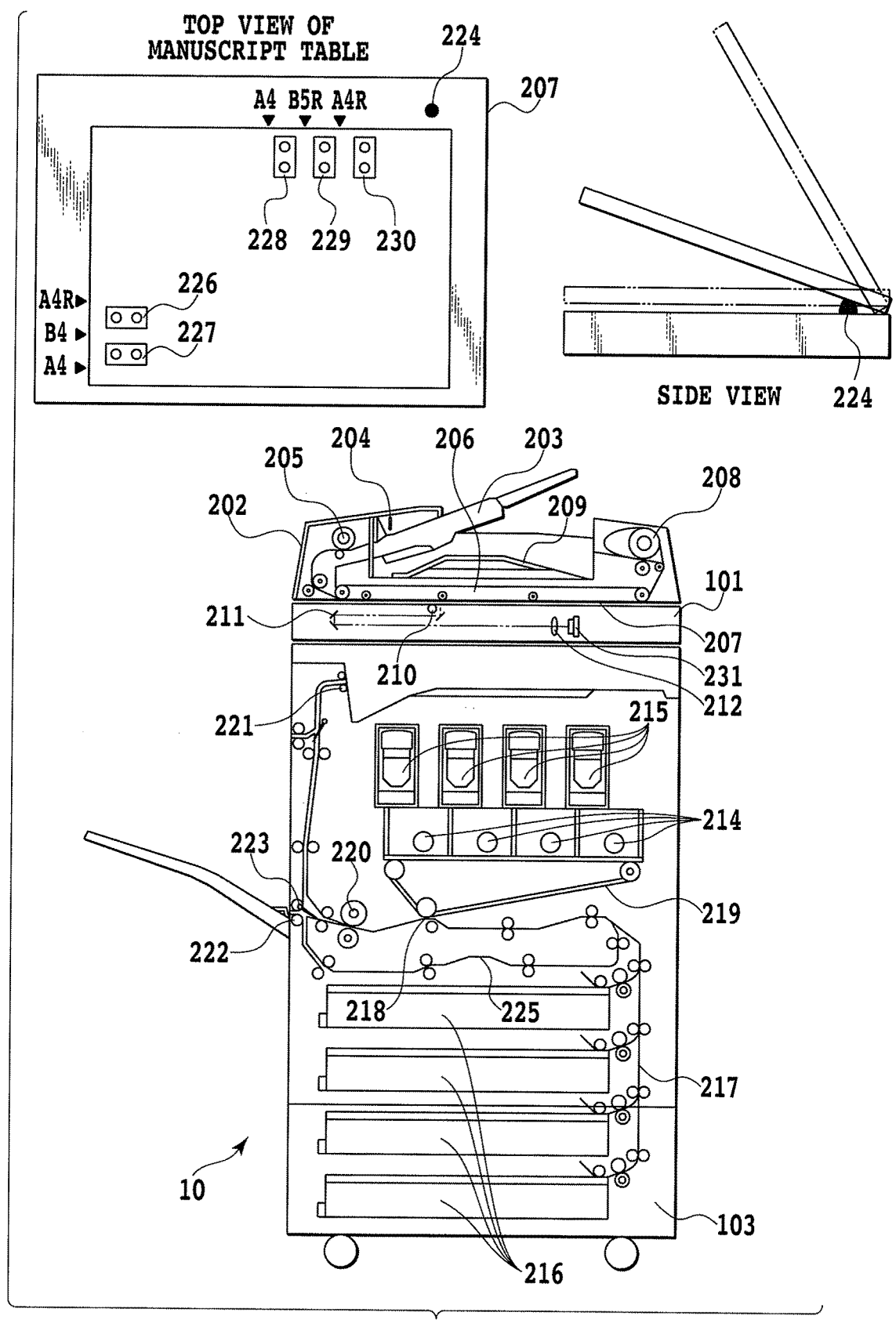
FIG. 2 is a cross section showing the image forming apparatus according to the first embodiment.

FIG. 2 is a cross section showing the image forming apparatus 10. By referring to FIG. 2, the image forming apparatus 10 in FIG. 1 will be in more detail explained.

The image forming apparatus 10 has the functions of copying, printing and faxing. As shown in FIG. 2, the image forming apparatus 10 in the first embodiment includes the scanner unit 101, a document feeding (DF) unit 202 and the printing unit 103.

First, a reading operation of an image performed mainly by the scanner unit 101 will be explained. In a case of setting a manuscript on a manuscript table 207 in FIG. 2 to read the manuscript, the manuscript is set on the manuscript table 207 and the DF 202 is closed. Thereafter, an opening/closing sensor 224 detects that the manuscript table 207 has been closed, and optical reflection type manuscript-size detecting sensors 226 to 230 accommodated in a casing of the scanner unit 101 detect a size of the manuscript set on the manuscript table 207. A light source 210 starts to illuminate the manuscript based upon the size detection and a CCD (charge-coupled device) 231 receives reflected light through a reflecting plate 211 and a lens 212 from the manuscript to read an image. The controller 102 in the image forming apparatus 10 converts the image data read by the CCD 231 into a digital signal, performing image processing for scanning, and stores the image as image data for printing in the memory 105 in the controller 102.

In a case of setting a manuscript on the DF 202 to read the manuscript, the manuscript is so arranged as to face up on a tray of a manuscript setting unit 203 in the DF 202. Thereafter, a manuscript detecting sensor 204 detects that the manuscript is set, and a sheet feeding roller 205 and a carrier belt 206 rotate in response to this detection to carry the manuscript, which is thereafter set at a predetermined position on the manuscript table 207. Subsequently, the image data is read in the same way as in a case where the image is read on the manuscript table 207 and the obtained image data for printing is stored in the memory 105 in the controller 102.

Completion of the image reading causes the carrier belt 206 to rotate once more and feed the manuscript to a right side in the cross section of the image forming apparatus in FIG. 2, and the manuscript is discharged to a manuscript discharging tray 209 via a carrier roller 208 in the discharged side. In a case where a plurality of manuscripts exist, the manuscript is discharged and carried to the right side in the cross section of the image forming apparatus from the manuscript table 207 and at the same time, the next manuscript is fed from the left side in the cross section of the image forming apparatus via the sheet feeding roller 205, thus continuously performing the reading of the next manuscript. The operation of the scanner unit 101 is performed as described above.

Next, a printing operation performed mainly at the printing unit 103 will be explained. The image data for printing once stored in the memory 105 in the controller 102 is once more subject to image processing for printing, which will be described later, in the controller 102 and thereafter, is transferred to the printing unit 103. In the printing unit 103, the image data is converted into a pulse signal by PWM control in the printing unit 103 and at a laser printing unit, is converted into print laser light of four colors composed of yellow, magenta, cyan, and black. The print laser light illuminates a photosensitive element 214 of each color to form an electrostatic latent image on each photosensitive element 214. The printing unit 103 performs a toner phenomenon to each photosensitive element by toner supplied from a toner cartridge 215 and a toner image visualized on each photosensitive element is primarily transferred on an intermediate transfer belt 219. The intermediate transfer belt 219 rotates in a clockwise orientation in FIG. 2. When a print paper fed from a sheet cassette 216 through a sheet feeding carrier path 217 arrives at a secondary transfer position 218, the toner image is transferred from the intermediate transfer belt 219 onto the print paper.

At a fixing container 220, toner is fixed by pressurizing and heating on the print paper on which the image is transferred, and the print paper is carried to the sheet delivery carrier path. Thereafter, the print paper is discharged to a center tray 221 at a face downward or a side tray 222 at a face upward. A flapper 223 changes the carrier path for changing these sheet discharging openings. In a case of double-faced printing, after the print paper passes through the fixing container 220, the flapper 223 changes the carrier path and thereafter, the print paper is switched back in a downward orientation, and the print paper is fed through a paper carrier path 225 for double-faced printing at the secondary transfer position 218 once more, thus performing the double-faced printing.

Next, the aforementioned image processing for printing will be explained with reference to FIG. 3.

Figure 3:
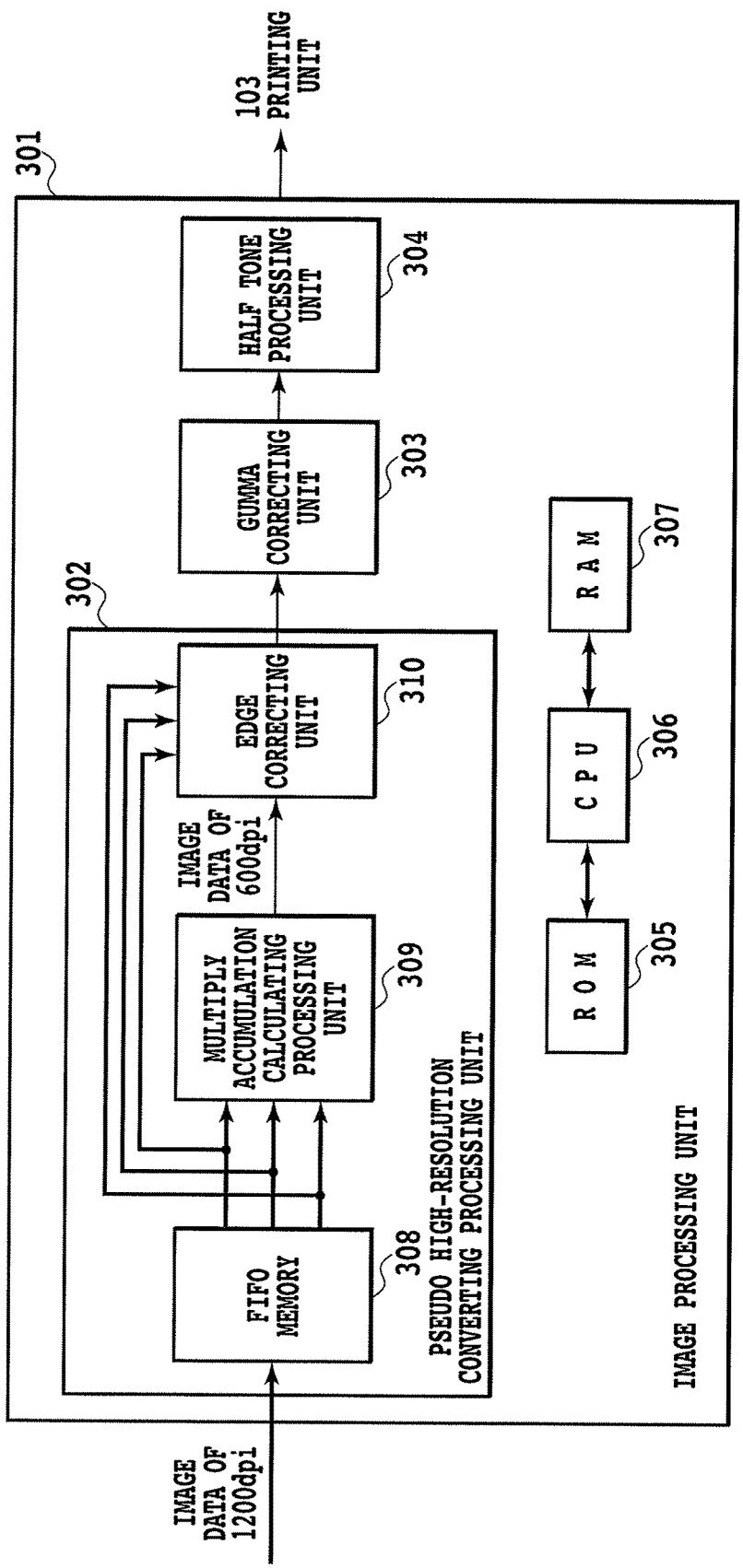
FIG. 3 is a block diagram showing an image processing unit according to the first embodiment.

FIG. 3 is a block diagram showing the image processing unit 301.

The image processing unit 301 in FIG. 3 performs image processing for printing in the controller 102 in FIG. 1. Here, the image data for printing once printed in the memory 105 in the controller 102 is data of eight bits and has the color number of 256 gradations per one pixel. Pseudo high-resolution converting processing to be described later is performed to the image data for printing input from the memory 105 at a pseudo high-resolution converting processing unit 302, thereby converting the image data with a resolution of 1200 dpi into that with resolution of 600 dpi. Thereafter, a gamma correction is made in a gamma correcting unit 303, and in the half tone processing unit 304, the image data for printing of eight bits is converted into that of four bits printable in the printing unit 103, which is thereafter delivered to the printing unit 103.

A CPU 306 in FIG. 3 controls an operation of the entire image processing unit 301 based upon a control program stored in a ROM 305. A RAM 307 is used as an operational region of the CPU 306. In the RAM 307, besides, a multiply accumulation calculating coefficient to be described later, edge patterns for edge judgment and edge correction tables used for a density correction of the edge are recorded.

Next, the processing of the pseudo high-resolution converting processing unit 302 in FIG. 3 will be in detail explained with reference to FIGS. 3 to 6.

Figure 4:
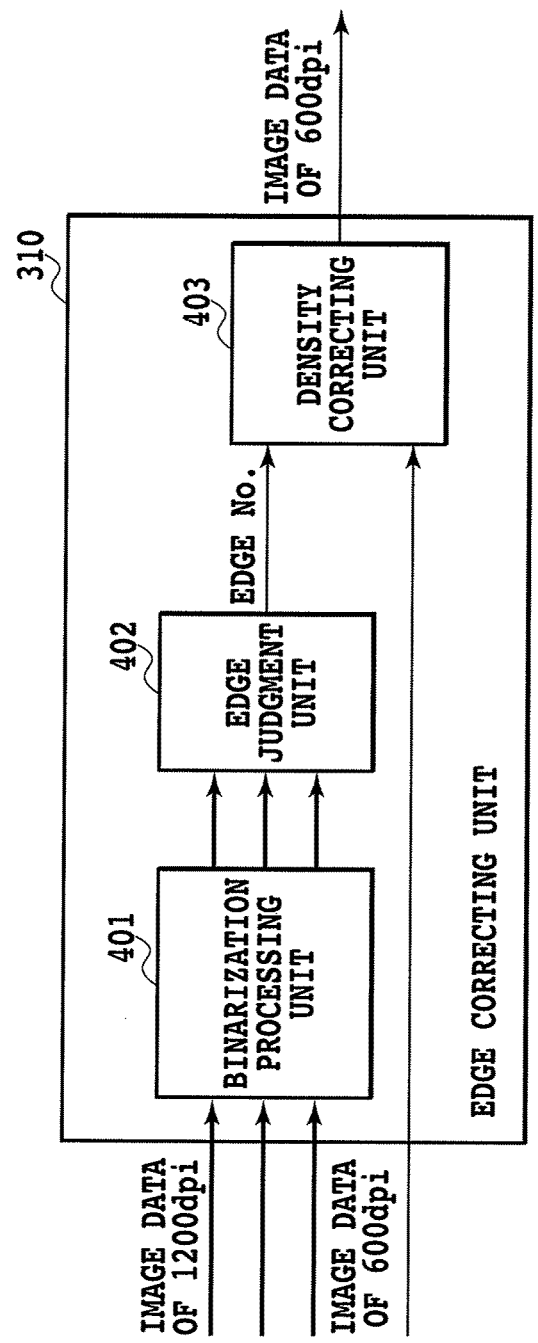
FIG. 4 is a block diagram showing an edge correcting unit according to the first embodiment.
Figure 5:
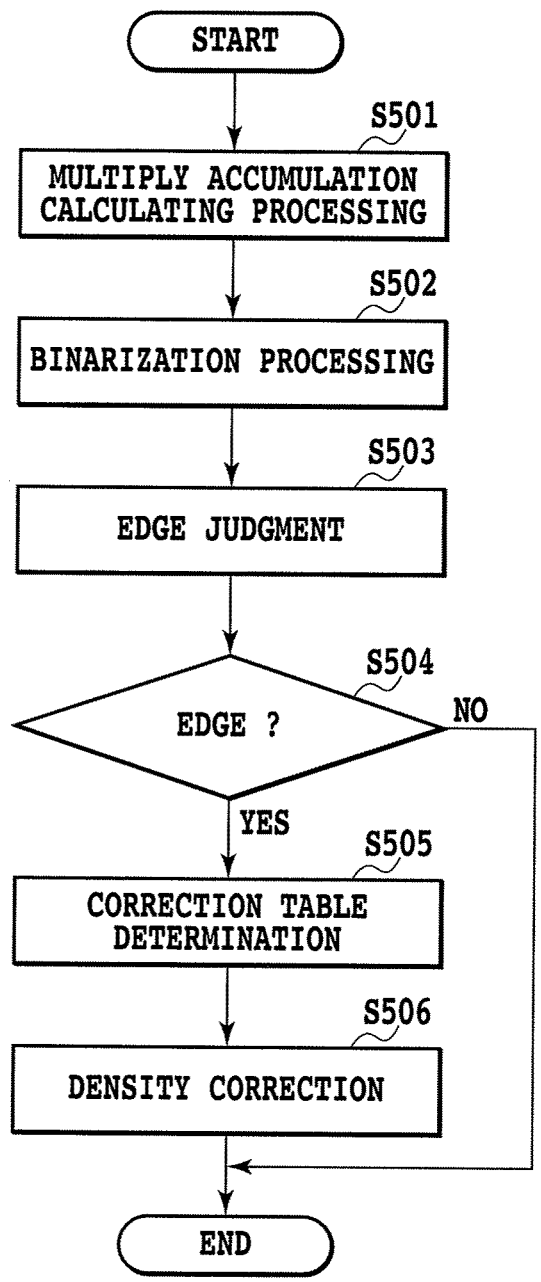
FIG. 5 is a flowchart showing pseudo high-resolution converting processing according to the first embodiment.
Figure 6:
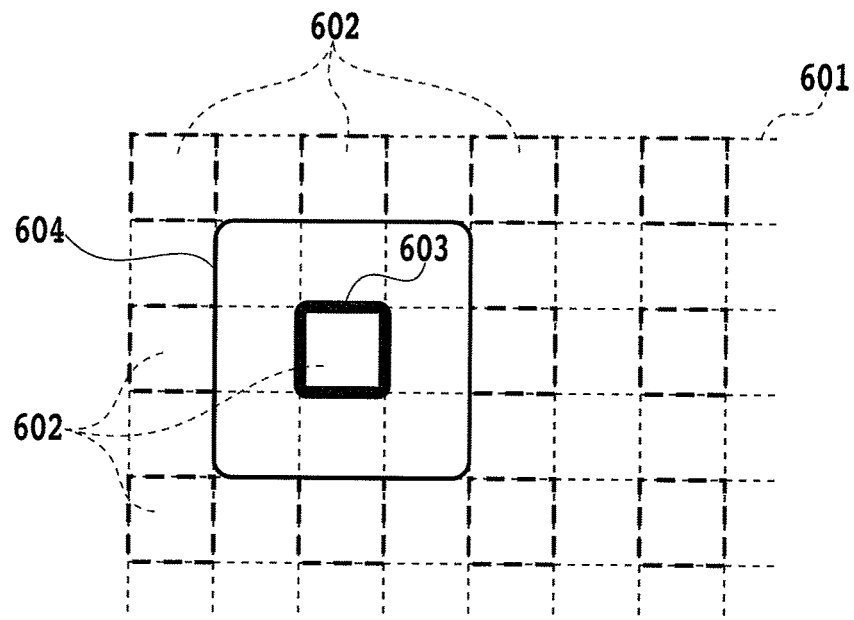
FIG. 6 is a diagram showing a relation between an image data for printing and a processing rectangle according to the first embodiment.

FIG. 4 is a block diagram showing an edge correcting unit 310 in FIG. 3. FIG. 5 is a flow chart showing the pseudo high-resolution converting processing in the pseudo high-resolution converting processing unit 302 in FIG. 3. FIG. 6 is a diagram showing a relation between an image data for printing and a processing rectangle in the pseudo high-resolution converting processing.

First, at step S501 in FIG. 5, a multiply accumulation calculating processing unit 309 in FIG. 3 performs the multiply accumulation calculating processing to be described later. A processing rectangle having nine pixels with a sum of a width of 3 pixels and a height of 3 pixels used in the multiply accumulation calculating processing is input from the image data for printing of 1200 dpi corresponding to three lines delayed by two lines at a FIFO memory 308 to the multiply accumulation calculating processing unit 309. The image data for printing of 600 dpi is outputted by one pixel from the multiply accumulation calculating processing unit 309 by the multiply accumulation calculating processing.

FIG. 6 shows a relation between an image data 601 for printing of 1200 dpi and a processing rectangle 604 composed of nine pixels around a pixel of interest 603. Since the pseudo high-resolution converting processing in the present embodiment is the converting processing from 1200 dpi into 600 dpi, the processing rectangle 604 is sequentially generated to the image data 601 for printing of 1200 dpi in such a manner that the pixel of interest 603 corresponds to positions 602 which are spaced by an interval of one pixel longitudinally or laterally.

Next, at step S502 in FIG. 5, a binarization processing unit 401 in the edge correcting unit 310 shown in FIG. 4 processes the processing rectangle 604 of 1200 dpi to be binary. The binarization processing converts all values of the nine pixels in the processing rectangle 604 in FIG. 6 into numeral 1 (black pixel) when the value is larger than a binarization threshold value and into numeral 0 (white pixel) when the value is equal to or smaller than the binarization threshold value. In the present embodiment, the binarization threshold value is made to numeral 0 as one example.

Next, at step S503 in FIG. 5, the edge judgment unit 402 in the edge correcting unit 310 shown in FIG. 4 performs edge judgment processing to be described later. The edge judgment unit 402 judges whether or not the result of the binarization of the rectangle region 604 binarized by the binarization processing at step S502 corresponds to an edge pattern to be described later.

Next, in a case where the edge judgment processing at step S503 judges that the edge pattern corresponding to the binarization result exists, at step S504 it is judged that the processing rectangle 604 in FIG. 6 is an edge, and the process goes to step S505. In a case where the edge judgment processing at step S503 judges that the edge pattern corresponding to the binarization result does not exist, at step S504 it is judged that the processing rectangle 604 is not the edge, and one pixel of 600 dpi found at step S501 is outputted without performing density correcting processing to be described later.

Next, at step S505, the edge judgment unit 402 in the edge correcting unit 310 shown in FIG. 4 outputs an edge number corresponding to the edge pattern in accordance with the binarization result of the processing rectangle 604 in FIG. 6. The density correcting unit 403 in the edge correcting unit 310 shown in FIG. 4 determines an edge correction table used for the density correcting processing from the outputted edge number.

Finally, at step S506, the density correcting unit 403 in the edge correcting unit 310 performs the density correcting processing to the one pixel of 600 dpi found at step S501 by using the edge correction table determined at step S505, and thereafter, outputs the image data. A detail of the density correcting processing and the edge correction table will be explained later.

Next, by referring to FIGS. 6 to 8, a detail of the multiply accumulation calculating processing performed at the multiply accumulation calculating processing unit 309 of FIG. 3 will be explained.

Figure 7:
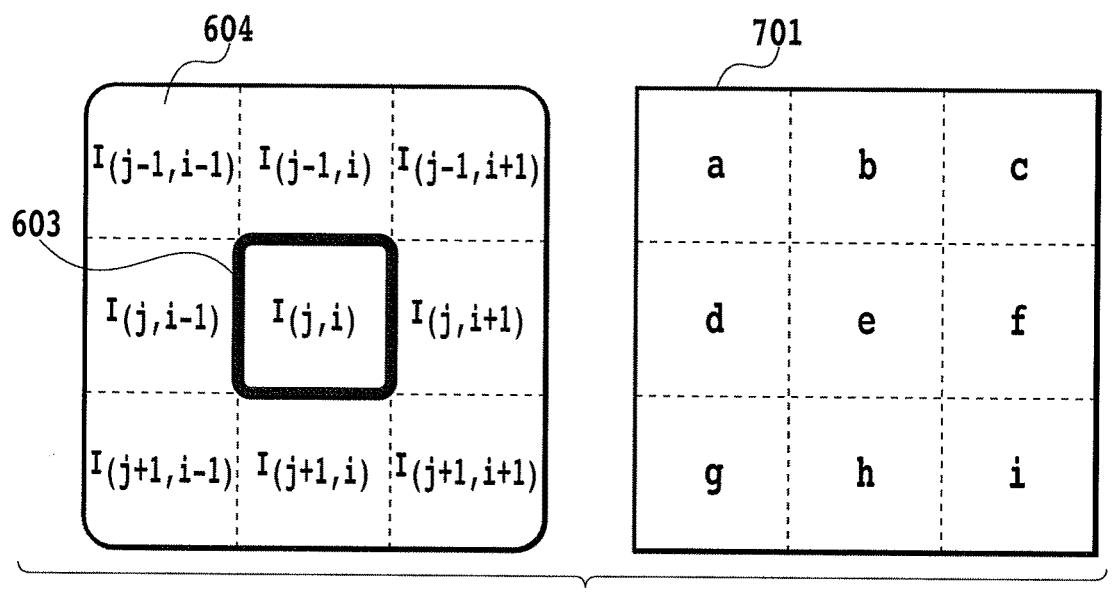
FIG. 7 is a diagram showing a relation between a processing rectangle and a multiply accumulation calculating coefficient according to the first embodiment.
Figure 8:
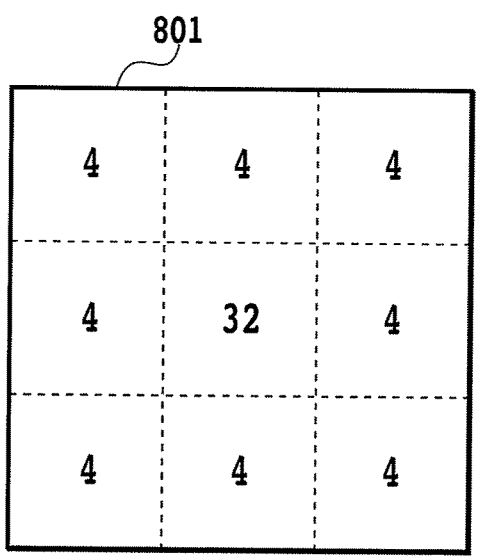
FIG. 8 is a diagram showing an example of a multiply accumulation calculating coefficient according to the first embodiment.

FIG. 7 is a diagram showing a relation between a processing rectangle and a multiply accumulation calculating coefficient in the multiply accumulation calculating processing. As described above, the processing rectangle 604 in FIG. 6 input to the multiply accumulation calculating processing unit 309 in FIG. 3 is constructed of a sum of nine pixels around the pixel of interest 603. The multiply accumulation calculating coefficient 701 in FIG. 7 has nine values a to i corresponding to the respective nine pixels contained in the processing rectangle 604. When coordinates of the pixel of interest 603 in FIG. 7 are made of (j, i) and a value of a pixel is I (j, i), the result OUT of the multiply accumulation calculating processing is found according to the following formula.

$$OUT=(I(j-1, i-1) \times a + I(j-1, i) \times b + I(j-1, i+1) \times c + I(j, i-1) \times d + I(j, i) \times e + I(j, i+1) \times f + I(j+1, i-1) \times g + I(j+1, i) \times h + I(j+1, i+1) \times i) >> 6$$

In this calculation, a product of each pixel in the processing rectangle 604 in FIG. 7 and a value of the multiply accumulation calculating coefficient 701 corresponding to the coordinates of the pixel is found, and the products corresponding to nine pixels are summed up, which are shifted right by six bits. This bit shift means that the summed value of the nine pixels is divided by 64. A sum of a to i of the multiply accumulation calculating coefficient 701 in FIG. 7 is set so as to be 64. A multiply accumulation calculating coefficient 801 in FIG. 8 is an example in regard to values a to i of the multiply accumulation calculating coefficient 701 in the present embodiment, and a sum of the multiply accumulation calculating coefficient 801 is 64 as described above.

Here, in the above multiply accumulation calculating processing, a sum of the products is divided by 64, but not limited thereto and for example, a sum of the products by the processing rectangle 604 may be divided by a sum of a to i of the multiply accumulation calculating coefficient 701 in FIG. 7. a to i of the multiply accumulation calculating coefficient 701 in FIG. 7 are made to a decimal figure, and the sum is made to one. In consequence, it is required only to find a sum of the products by the processing rectangle 604.

Next, by referring to FIGS. 9 to 11, a detail of the edge judgment processing performed at the edge judgment unit 402 in the edge correcting unit 310 shown in FIG. 4, the edge patterns used in the edge judgment processing, and the edge correction tables used in the density correcting unit 403 will be explained.

FIG. 9 is an example showing edge patterns in the present embodiment. FIG. 10 is an example showing edge correction tables associated with the edge patterns according to the present embodiment. FIG. 11 is a diagram showing an input/output characteristic in the edge correction table with a graph of two axes.

An edge pattern 901 in FIG. 9 is a pattern called the edge number of 0 in which only one pixel of nine pixels in the upper right corner has numeral 1 and each pixel other than that has numeral 0. The edge pattern 901 in FIG. 9 is made associated with an edge correction table 1001 in FIG. 10 and is stored in the RAM 307 in FIG. 3. Likewise, an edge pattern 902 in FIG. 9 called the edge number of 1 is made associated with an edge correction table 1002 in FIG. 10 and is stored in the RAM 307 in FIG. 3. An edge pattern 903 in FIG. 9 called the edge number of 2 is made associated with an edge correction table 1003 in FIG. 10 and is stored in the RAM 307 in FIG. 3. Likewise, in the present embodiment, the edge patterns 901 to 916 corresponding to the edge numbers 0 to 15 in FIG. 9 and the edge correction tables 1001 to 1016 in FIG. 10 are made associated with each other and are stored in the RAM 307 in FIG. 3.

In the edge judgment processing at step S503 in FIG. 5, the processing rectangle 604 which is binarized to numeral 1 or 0 by the binarization processing unit 401 in FIG. 4 and all of the edge patterns 901 to 916 in FIG. 9 are compared. It is judged whether or not each of the edge patterns 901 to 916 in FIG. 9 corresponds to the binarized processing rectangle 604. When any of the edge patterns corresponding to the processing rectangle exists, the edge number of the corresponding edge pattern is outputted to the density correcting unit 403 in FIG. 4.

Figure 11:
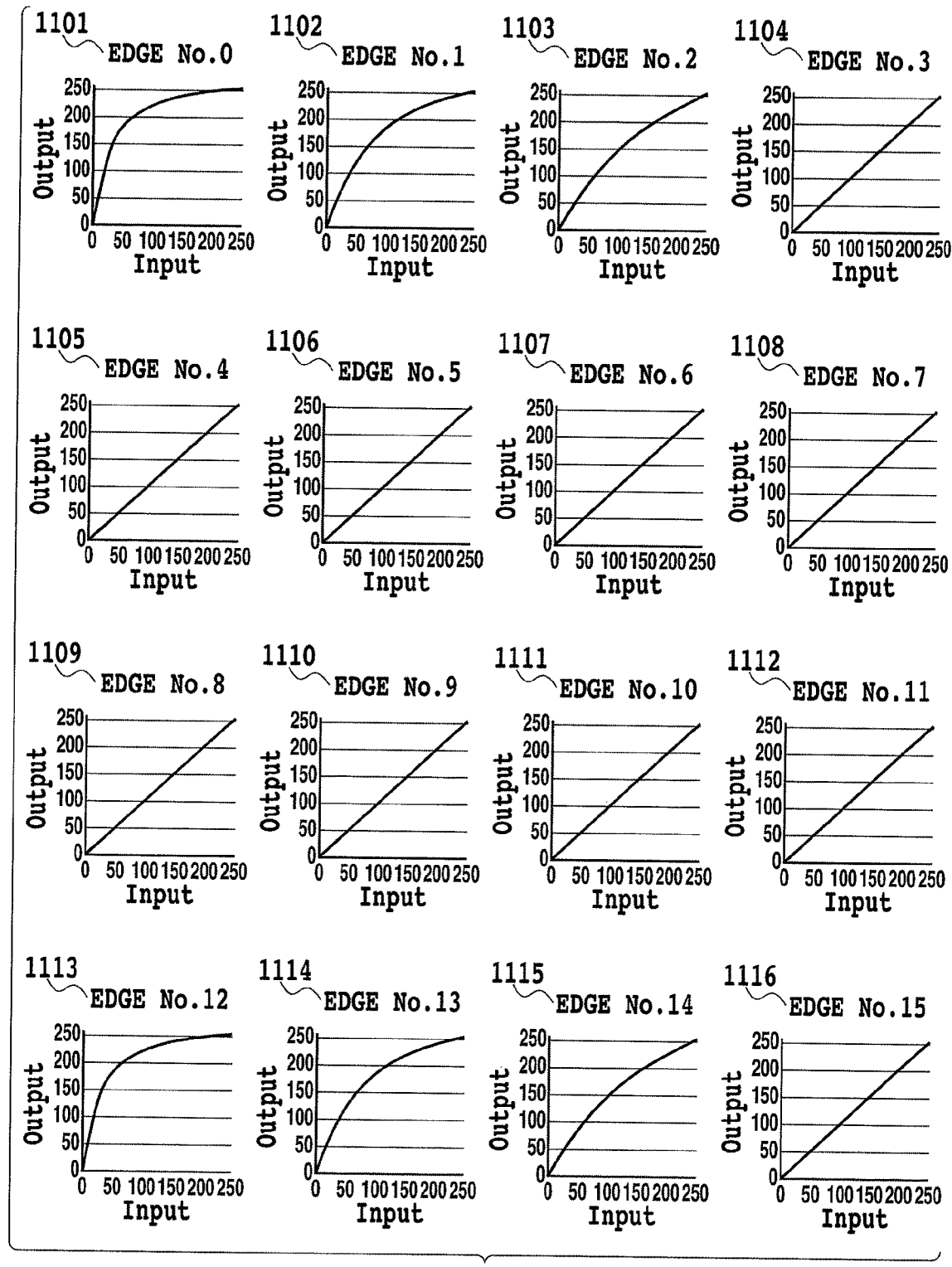
FIG. 11 is a diagram showing an example of an input/output characteristic in the edge correction table according to the first embodiment.

FIG. 11 is a graph showing input/output characteristics in the edge correction tables 1001 to 1016 in FIG. 10.

The input/output characteristic in the edge correction table 1001 in FIG. 10 is shown in a graph 1101 in FIG. 11. The input/output characteristic in the edge correction table 1002 in FIG. 10 is shown in a graph 1102 in FIG. 11. The input/output characteristic in the edge correction table 1003 in FIG. 10 is shown in a graph 1103 in FIG. 11. The input/output characteristic in the edge correction table 1004 in FIG. 10 is shown in a graph 1104 in FIG. 11.

For example, in the graph 1101 in FIG. 11 showing the input/output characteristic of the edge correction table 1001 in FIG. 10, an output value minus an input value is larger than in any of the graphs 1102 to 1104 showing the other input/output characteristics. Since this relation allows one pixel of 600 dpi to which the edge correction table 1001 in FIG. 10 is applied to largely increase the value in the density correcting processing performed at the density correcting unit 403 in FIG. 4, the edge density is strongly corrected, thus enabling the stable density reproduction.

On the other hand, in the graph 1104 in FIG. 11 showing the input/output characteristic in the edge correction table 1004 in FIG. 10 made associated with the edge pattern 904 in FIG. 9, the input value is nearly equal to the output value. Therefore, it can be said that the density correction is not made in the density correcting unit 403 in FIG. 4.

In the graphs 1102 and 1103 in FIG. 11 showing the input/output characteristics in the edge correction tables 1002 and 1003 in FIG. 10 made associated with the edge patterns 902 and 903 in FIG. 9, an intermediate density correction between the two edge correction tables is made. That is, in the edge pattern in which the numbers of numeral 1 are small (the numbers of black pixel are small), the pixel is converted into one pixel of 600 dpi having a very thin density by the multiply accumulation calculating processing to make the density reproduction unstable, therefore correcting the edge density strongly. In reverse, in the edge pattern in which the numbers of numeral 1 are the larger (the numbers of black pixel are larger), the pixel is converted into one pixel of 600 dpi having the stronger density by the multiply accumulation calculating processing, therefore correcting the edge density lightly.

In the edge correction tables 1001 to 1016 in FIG. 10, the density correction is made in consideration of characteristics of orientation in the edge patterns 901 to 916 in FIG. 9.

Since numeral 1 concentrates on the right side in the edge patterns 901 to 904 in FIG. 9, the edge patterns 901 to 904 form a pattern group for detecting edges in a specific orientation mainly at the left side.

Likewise, the edge patterns 905 to 908 of FIG. 9 form a pattern group for detecting edges in a specific orientation mainly at the lower side, the edge patterns 909 to 912 form a pattern group for detecting edges in a specific orientation mainly at the right side, and the edge patterns 913 to 916 form a pattern group for detecting edges in a specific orientation mainly at the upper side.

In FIG. 10, the edge correction tables 1013 to 1016 in the pattern group for detecting the edges at the upper side controls the density correction in accordance with the numbers of numeral 1 (the numbers of black pixel) in the same way as the edge correction tables 1001 to 1004 in the pattern group for detecting the edges at the left side.

On the other hand, the edge correction tables 1005 to 1012 in FIG. 10 in the pattern group in the edge patterns 905 to 912 in FIG. 9 for detecting the edges in the other orientation do not make the density correction in accordance with the numbers of numeral 1 (the numbers of black pixel) in the edge pattern, as understood from the graphs 1105 to 1112 in FIG. 11 showing the input/output characteristics.

Making the density correction substantially equally in the edges in all orientations including every specific orientation allows stable density reproduction and in reverse, prevents a color appearance of a thin line or a thin character from largely changing after printing or a thin line or a thin character from becoming a thick line or a thick character after printing.

Figures 22, 23:
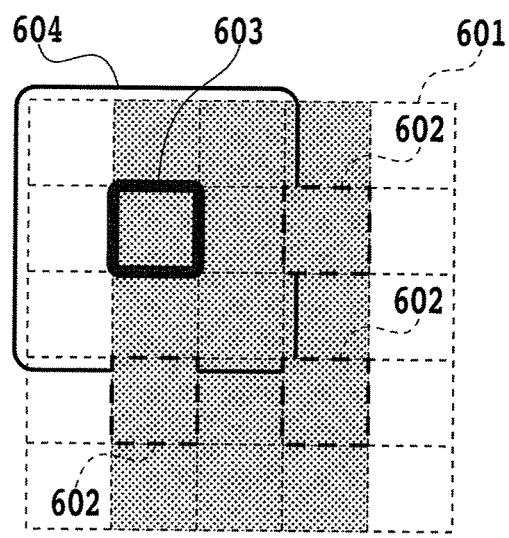
FIG. 22 is a diagram showing an example of edge tables according to the third embodiment.
FIG. 23 is a diagram showing an example of an image data for printing according to the first embodiment.

FIG. 23 is a diagram showing an example of an image data 601 for printing of 1200 dpi. A line having a width of three pixels is drawn in a center of the image data for printing 601 in FIG. 23.

Figure 24A:
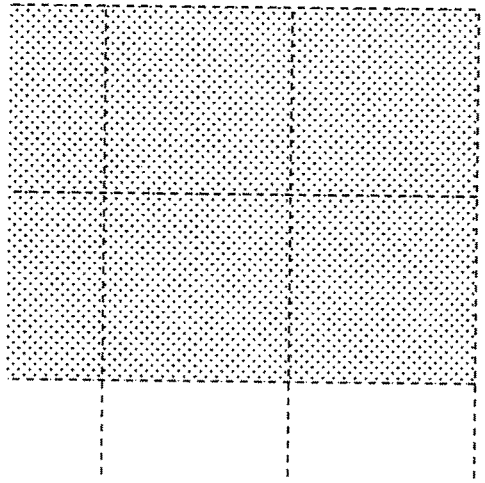
FIG. 24A is an example showing the result of pseudo high-resolution converting processing according to the first embodiment.
Figure 24B:
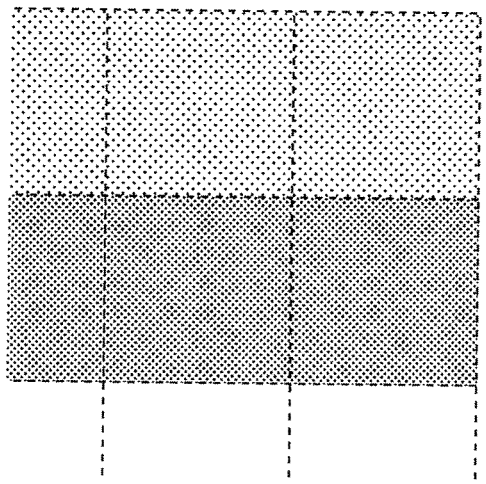
FIG. 24B is an example showing the result of pseudo high-resolution converting processing according to the first embodiment.
Figure 24C:
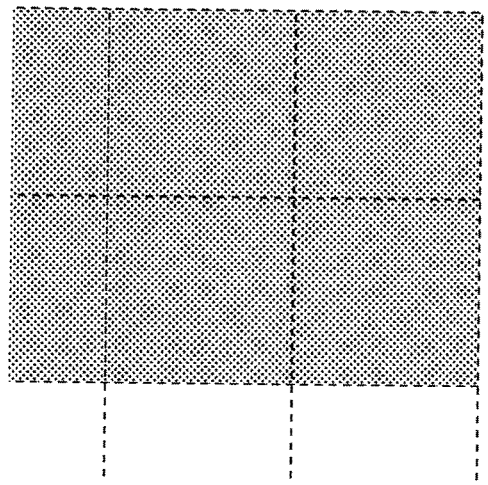
FIG. 24C is an example showing the result of pseudo high-resolution converting processing according to the first embodiment.

FIGS. 24A, 24B and 24C are examples showing the result of a pseudo high-resolution converting processing to the image data for printing in FIG. 23. FIG. 24A shows an image data of 600 dpi immediately after the multiply accumulation calculating processing is performed. FIG. 24B shows an image data of 600 dpi after the edge correcting processing is performed using the edge pattern and the edge correction table in the present embodiment. FIG. 24C is an image data of 600 dpi in a case where the density correction is made equally in strength to the edges in all orientations not considering the characteristic of orientation of the edge. It is to be understood that in FIG. 24C, thick lines are reproduced as each having a thicker density than in FIG. 24A or FIG. 24B.

It should be noted that in the explanation of the present embodiment, the density correction is made only to the edges at the upper side and at the left side, but the present invention is not limited thereto, and a lighter density correction may be made to the edges, for example, at the lower side and at the right side than at the upper side and at the left side. Further, for example, the edges in the other orientation, such as the edges only at the lower side and at the right side may be corrected strongly in density. The edge pattern also is not limited to the pattern described in the present embodiment.

As explained above, according to the first embodiment, the edge alone is set as an object for control, and it is possible to locally control the edge density in accordance with a shape of the edge (edge pattern). Therefore, it is possible to stabilize the spot multiplexing to reproduce the image without changing the color appearance of the character or the entire line.

<Second Embodiment>

In the first embodiment, the pseudo high-resolution converting processing by the processing rectangle having a width of three pixels and a height of three pixels is explained in the multiply accumulation calculating processing unit 309 and the edge correcting unit 310 in FIG. 3.

In the present embodiment, pseudo high-resolution converting processing by a processing rectangle having a width of two pixels and a height of two pixels will be in detail explained with reference to the following drawings. It should be noted that since components other than the pseudo high-resolution converting processing unit 302 are identical to those in the first embodiment, an explanation for the components is omitted.

Figure 12:
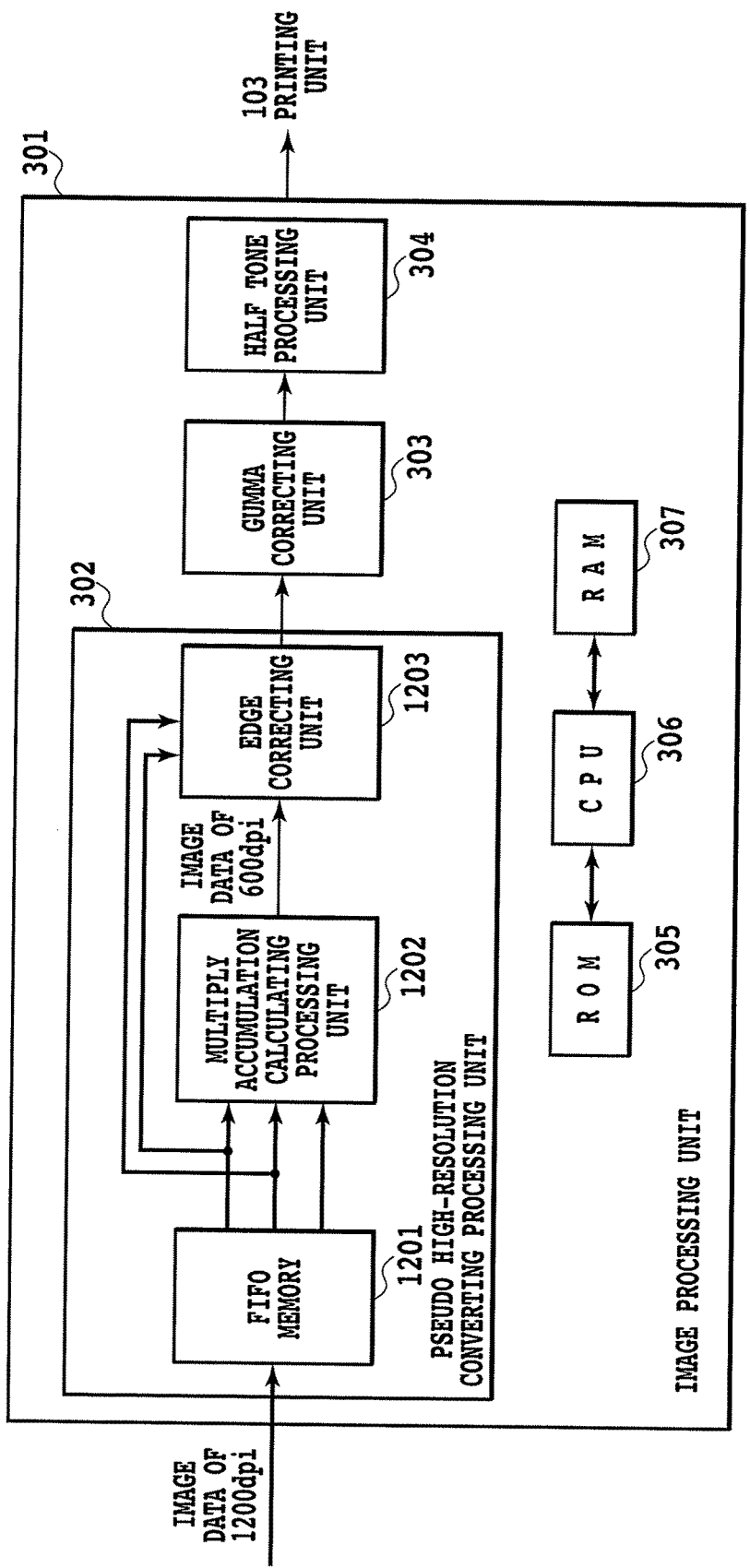
FIG. 12 is a block diagram showing an image processing unit according to a second embodiment.

By referring to FIG. 5, and FIGS. 12 to 14, the processing of the pseudo high-resolution converting processing unit 302 in FIG. 12 will be in detail explained.

FIG. 12 is a block diagram showing an image processing unit 301 in the second embodiment.

Figure 13:
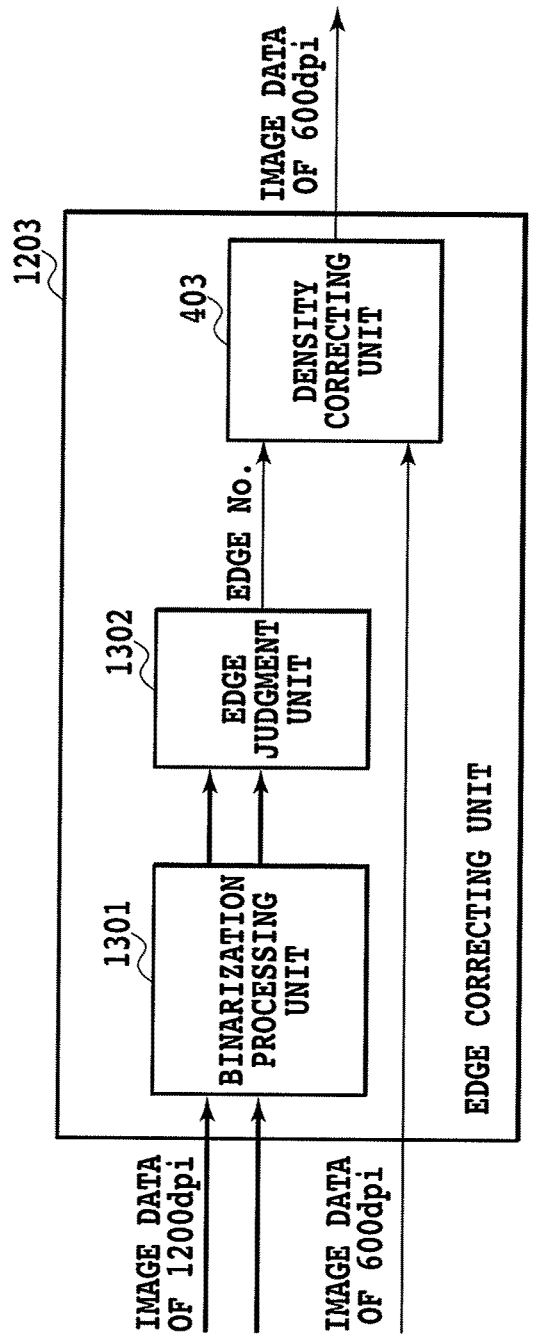
FIG. 13 is a block diagram showing an edge correcting unit according to the second embodiment.

FIG. 13 is a block diagram showing an edge correcting unit 1203.

Figure 14:
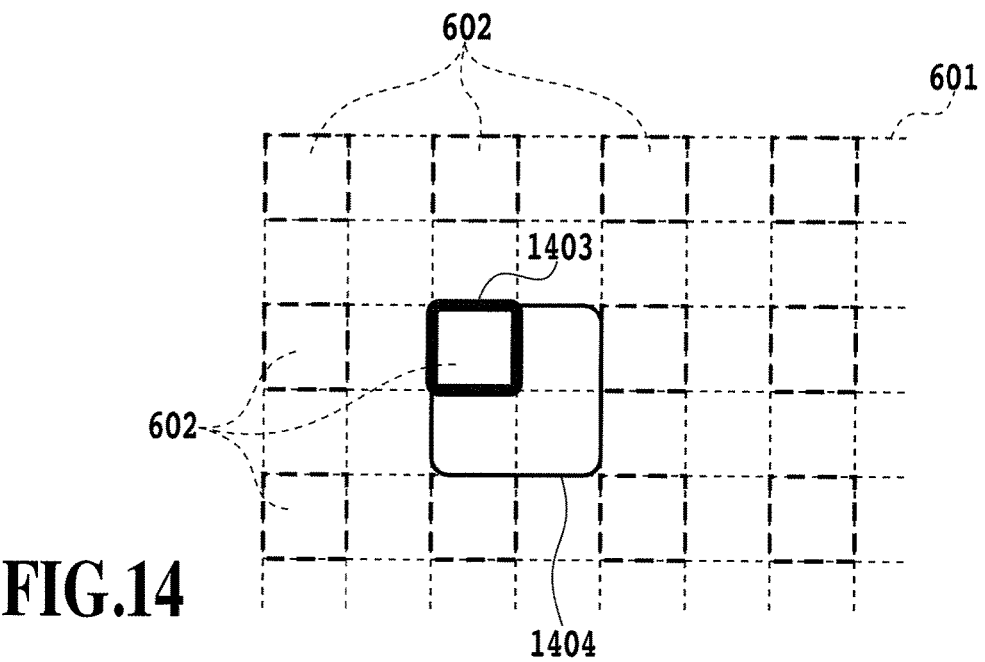
FIG. 14 is a diagram showing a relation between an image data for printing and a processing rectangle according to the second embodiment.

FIG. 14 is a diagram showing a relation between an image data for printing and a processing rectangle in the pseudo high-resolution converting processing.

First, in the second embodiment, at step S501 in FIG. 5, the multiply accumulation calculating processing unit 1202 in FIG. 12 performs multiply accumulation calculating processing to be described later. The processing rectangle formed of four pixels with a sum of a width of two pixels and a height of two pixels in use for the multiply accumulation calculating processing is input to the multiply accumulation calculating processing unit 1202 in FIG. 12 from the image data for printing of 1200 dpi corresponding to a two-line amount delayed by one-line amount at a FIFO memory 1201. According to the multiply accumulation calculating processing, the image data for printing of 600 dpi is outputted by one pixel from the multiply accumulation calculating processing unit 1202.

FIG. 14 shows a relation between an image data 601 for printing of 1200 dpi and a processing rectangle 1404 composed of four pixels around a pixel of interest 1403. The pseudo high-resolution converting processing in the present embodiment is converting processing from the image data of 1200 dpi into the image data of 600dpi. Therefore, the processing rectangle 1404 in FIG. 14 is sequentially generated to the image data 601 for printing of 1200 dpi in such a manner that the pixel of interest 1403 corresponds to positions 602 which are spaced by an interval of one pixel longitudinally or laterally.

Next, at step S502 in FIG. 5, a binarization processing unit 1301 in the edge correcting unit 1203 shown in FIG. 13 processes the processing rectangle 1404 of 1200 dpi in FIG. 14 to be binary. The binarization processing converts all values of four pixels in the processing rectangle 1404 in FIG. 14 into numeral 1 when the value is larger than a predetermined binarization threshold value and into numeral 0 when the value is equal to or smaller than the binarization threshold value. In the present embodiment, the binarization threshold value is made to numeral 0 as one example.

Next, at step S503 in FIG. 5, an edge judgment unit 1302 in the edge correcting unit 1203 shown in FIG. 13 performs edge judgment processing to be described later. The edge judgment unit 1302 in FIG. 13 judges whether or not the result of the binarization of the rectangle region 1404 in FIG. 14 binarized by the binarization processing corresponds to an edge pattern to be described later.

Next, in a case where the edge judgment processing at step S503 judges that the edge pattern corresponding to the binarization result exists, at step S504 it is judged that the processing rectangle 1404 in FIG. 14 is an edge, and the process goes to step S505.

In a case where the edge judgment processing at step S503 judges that the edge pattern corresponding to the binarization result does not exist, at step S504 it is judged that the processing rectangle 1404 is not the edge, and one pixel of 600 dpi found at step S501 is outputted without performing the density correcting processing to be described later.

Next, at step S505, the edge judgment unit 1302 in the edge correcting unit 1203 shown in FIG. 13 outputs an edge number corresponding to the edge pattern in accordance with the binarization result of the processing rectangle 1404 in FIG. 14. The density correcting unit 403 in the edge correcting unit 1203 determines an edge correction table used for the density correcting processing from the outputted edge number.

Finally, at step S506, the density correcting unit 403 in the edge correcting unit 1203 in FIG. 12 performs the density correcting processing to the one pixel of 600 dpi found at step S501 by using the edge correction table determined at step S505, and thereafter, outputs the image data. A detail of the density correcting processing and the edge correction table will be explained later.

Next, by referring to FIGS. 14 to 16, the multiply accumulation calculating processing performed at the multiply accumulation calculating processing unit 1202 in FIG. 12 will be explained.

Figure 15:
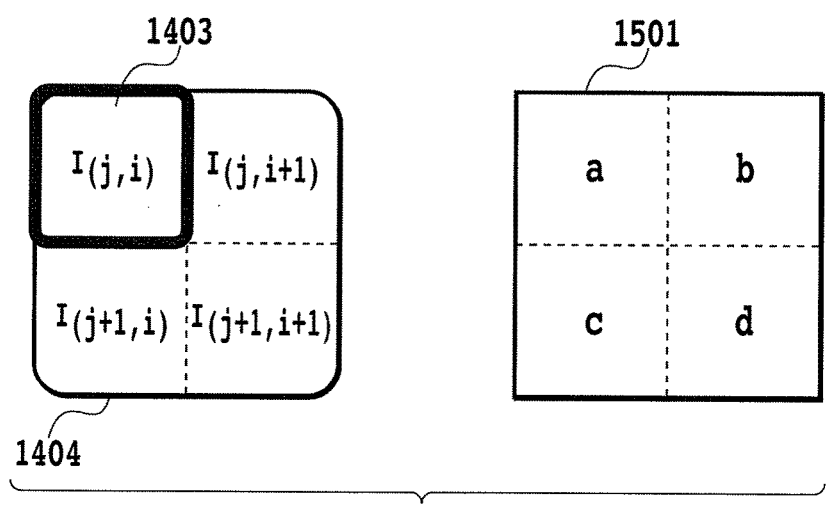
FIG. 15 is a diagram showing a relation between a processing rectangle and a multiply accumulation calculating coefficient according to the second embodiment.

FIG. 15 is a diagram showing a relation between a processing rectangle and a multiply accumulation calculating coefficient in the multiply accumulation calculating processing. As described above, the processing rectangle 1404 in FIG. 15 input to the multiply accumulation calculating processing unit 1202 in FIG. 12 is constructed of a sum of four pixels around the pixel of interest 1403. The multiply accumulation calculating coefficient 1501 in FIG. 15 has four values a to d corresponding to the respective four pixels constituting the processing rectangle 1404. Coordinates of the pixel of interest 1403 in FIG. 15 are made of (j, i). When a value of a pixel is I (j, i), the result OUT of the multiply accumulation calculating processing is found according to the following formula.

$$OUT = (I(j, i) \times a + I(j, i+1) \times b + I(j+1, i) \times c + I(j+1, i+1) \times d) >> 6$$

In this calculation, a product of each pixel in the processing rectangle 1404 in FIG. 15 and a value of the multiply accumulation calculating coefficient 1501 corresponding to the coordinates of the pixel is found, and the products corresponding to four pixels are summed up, which are shifted right by six bits. This hit shift means that a sum of four pixels is divided by 64. A sum of a to d of the multiply accumulation calculating coefficient 1501 in FIG. 15 is set so as to be 64. A multiply accumulation calculating coefficient 1601 in FIG. 16 is an example of values a to d of the multiply accumulation calculating coefficient 1501 in the present embodiment, and a sum of the multiply accumulation calculating coefficient 1601 is 64 as described above.

Here, in the above multiply accumulation calculating processing, a sum of the products is divided by 64, but the present invention is not limited thereto. For example, a sum of the products by the processing rectangle 1404 may be divided by a sum of a to d of the multiply accumulation calculating coefficient 1501 in FIG. 15. a to d of the multiply accumulation calculating coefficient 1501 in FIG. 15 are made to a decimal figure, and the sum is made to numeral 1. In consequence, it is required only to find a sum of the products by the processing rectangle 1404.

Next, by referring to FIGS. 17 to 19, a detail of the edge judgment processing performed at the edge judgment unit 1302 of the edge correcting unit 1203 shown in FIG. 13, the edge pattern used in the edge correcting processing, and the edge correction table used in the density correcting unit 403 will be explained.

Figure 17:
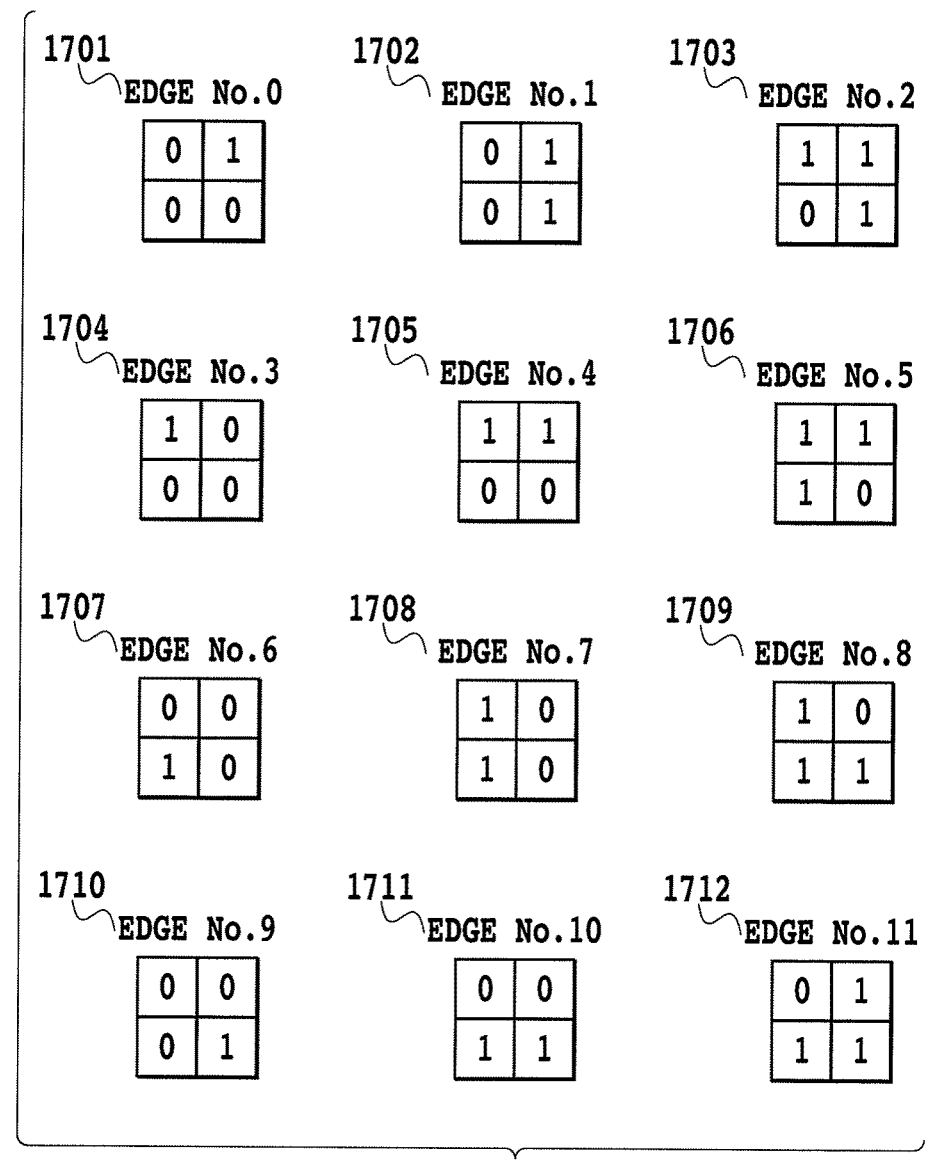
FIG. 17 is a diagram showing an example of edge patterns according to the second embodiment.

FIG. 17 is an example showing edge patterns in the present embodiment. FIG. 18 is an example showing edge correction tables made associated with the edge patterns according to the present embodiment.

Figure 19:
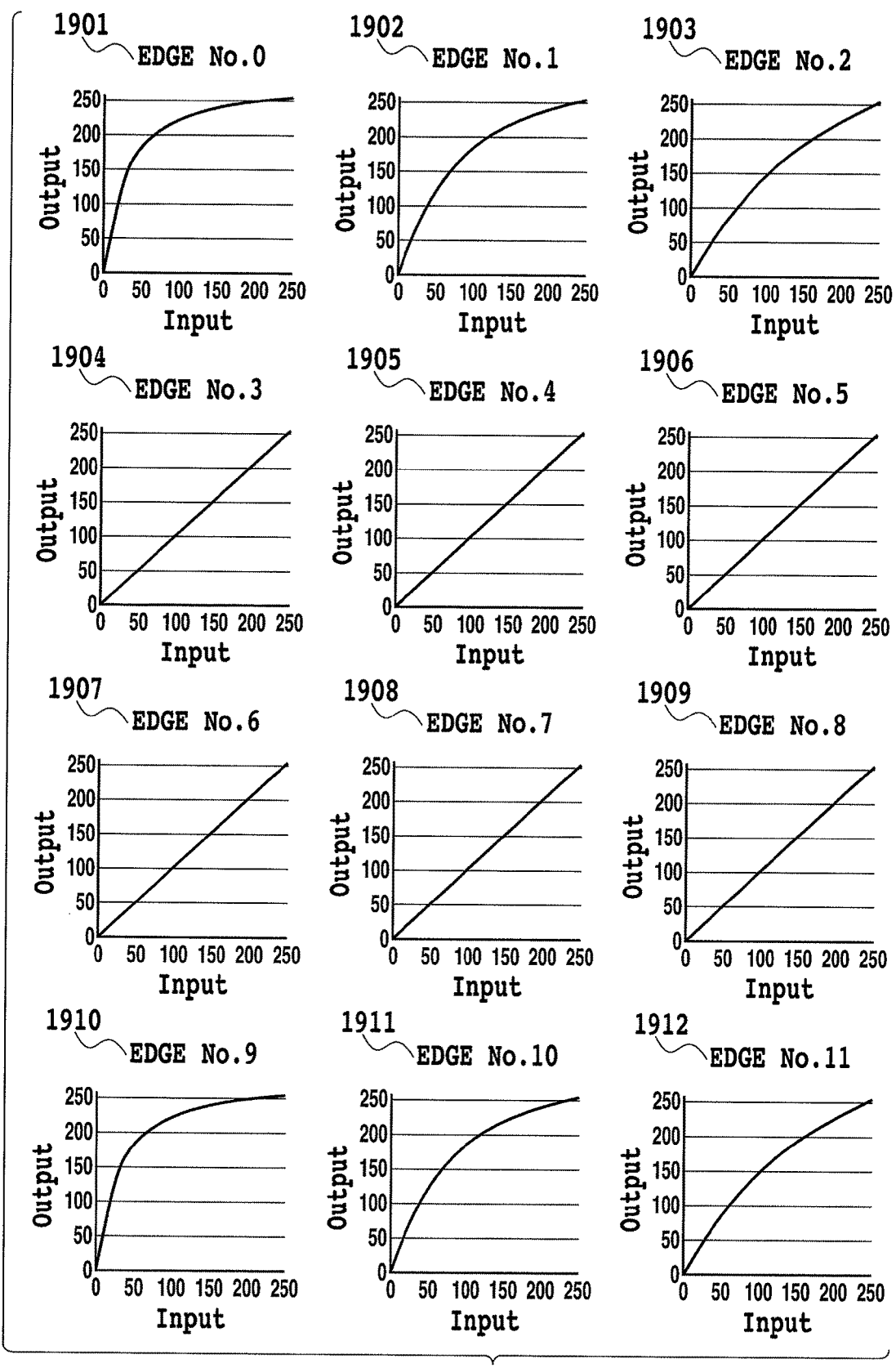
FIG. 19 is a diagram showing an example of an input/output characteristic in the edge correction table according to the second embodiment.

FIG. 19 is a diagram showing an input/output characteristic in the edge correction table with a graph of two axes.

An edge pattern 1701 in FIG. 17 is a pattern called the edge number of 0 in which only one pixel in the upper right corner in four pixels has numeral 1 and each pixel other than that has numeral 0. The edge pattern 1701 in FIG. 17 is made associated with an edge correction table 1801 in FIG. 18 and is stored in the RAM 307 in FIG. 12.

Likewise, an edge pattern 1702 in FIG. 17 called the edge number of 1 is made associated with an edge correction table 1802 in FIG. 18 and is stored in the RAM 307 in FIG. 12. Likewise, an edge pattern 1703 called the edge number of 2 in FIG. 17 is made associated with an edge correction table 1803 in FIG. 18 and is stored in the RAM 307 in FIG. 12.

In this way, in the present embodiment, the edge patterns 1701 to 1712 corresponding to the edge numbers 0 to 11 in FIG. 17 and the edge correction tables 1801 to 1812 in FIG. 18 in FIG. 18 are made associated with each other and are stored in the RAM 307 in FIG. 12.

In the edge judgment processing at step S503 in FIG. 5, the processing rectangle 1404 in FIG. 14 which is binarized to numeral 1 or 0 and all of the edge patterns 1701 to 1712 in FIG. 17 are compared by the binarization processing unit 1301 in FIG. 13. The binarization processing unit 1301 in FIG. 13 judges whether or not each of the edge patterns 1701 to 1712 in FIG. 17 corresponds to the binarized processing rectangle 1404 in FIG. 14. When any of the edge patterns corresponding to the processing rectangle exists, the edge number of the corresponding edge pattern is outputted to the density correcting unit 403.

FIG. 19 is a graph showing input/output characteristics in the edge correction tables 1801 to 1812 in FIG. 18.

The input/output characteristic in the edge correction table 1801 in FIG. 18 is shown in a graph 1901 in FIG. 19. The input/output characteristic in the edge correction table 1802 in FIG. 18 is shown in a graph 1902 in FIG. 19. The input/output characteristic in the edge correction table 1803 in FIG. 18 is shown in a graph 1903 in FIG. 19.

For example, in the graph 1901 showing the input/output characteristic of the edge correction table 1801 in FIG. 18, an output value minus an input value is larger than in each of the graphs 1902 and 1903 showing the other input/output characteristics.

Thereby, the following effect is produced. In the same way as in the first embodiment, in the density correcting processing performed at the density correcting unit 403 in FIG. 13, one pixel of 600 dpi to which the edge correction table 1801 in FIG. 18 is applied results in a large increase in value. Therefore, one pixel of 600 dpi is strongly corrected in density, thus enabling stable density reproduction.

When the edge correction tables 1802 and 1803 in FIG. 18 made associated with the edge patterns 1702 and 1703 in FIG. 17 are applied to one pixel, the pixel is corrected more lightly in density than in a case of the edge correction table 1801. That is, in the edge pattern in which the numbers of numeral 1 are small, the one pixel is converted into one pixel of 600 dpi having a very thin density by the multiply accumulation calculating processing to make the density reproduction unstable, therefore correcting the density strongly. In reverse, in the edge pattern in which the numbers of numeral 1 are the larger, one pixel is converted into one pixel of 600 dpi having the stronger density by the multiply accumulation calculating processing, therefore correcting the density lightly.

In the edge correction tables 1801 to 1812 in FIG. 18, the density correction is made in consideration of characteristics of orientation in the edge patterns 1701 to 1712 in FIG. 17.

Since numeral 1 concentrates on the right side in the edge patterns 1701 to 1703 in FIG. 17, the edge patterns 1701 to 1703 form a pattern group for detecting edges in a specific orientation mainly at the left side.

Likewise, the edge patterns 1704 to 1706 in FIG. 17 form a pattern group for detecting edges in a specific orientation mainly at the lower side, the edge patterns 1707 to 1709 form a pattern group for detecting edges in a specific orientation mainly at the right side and the edge patterns 1710 to 1712 form a pattern group for detecting edges in a specific orientation mainly at the upper side.

In FIG. 18, the edge correction tables 1810 to 1812 in the pattern group for detecting the edges at the upper side controls the density correction in accordance with the numbers of numeral 1 in the same way as the edge correction tables 1801 to 1803 in the pattern group for detecting the edges at the left side.

On the other hand, the edge correction tables 1804 to 1809 in FIG. 18 in the pattern group in the edge patterns 1704 to 1709 in FIG. 17 for detecting the edges in the other orientation do not make the density correction in accordance with the numbers of numeral 1 in the edge pattern as understood from the graphs 1904 to 1909 showing the input/output characteristics.

Thereby, in the same way as in the first embodiment, making the density correction substantially equal in the edges in all orientations including every specific orientation prevents a color appearance of a thin line or a thin character from largely changing after printing or a thin line or a thin character from becoming a thick line or a thick character after printing.

It should be noted that in the explanation of the present embodiment, the density correction is made only to the edges at the upper side and at the left side, but the present invention is not limited thereto, and a lighter-density correction may be made to the edges, for example, at the lower side and at the right side than at the upper side and at the left side. Further, for example, the edges in the other orientation, such as the edges only at the lower side and at the right side may be corrected strongly in density. The edge pattern also is not limited to the pattern described in the present embodiment.

As explained above, according to the second embodiment, also in a case where the pseudo high-resolution converting processing is performed in the processing rectangle having a height of two pixels and a width of two pixels, it is possible to stabilize the spot multiplexing for reproducing the image.

<Third Embodiment>

In the first embodiment and the second embodiment, the edge patterns used in the edge correcting unit 310 in FIG. 3 and in the edge correcting unit 1203 in FIG. 12 are made associated with the edge correction tables used in the density correcting units 403 in FIGS. 4 and 13 with a relation of one to one. In addition, the edge pattern and the edge correction table are stored at the associated state in the RAMs 307 in FIGS. 3 and 12 and are used.

In the present embodiment, a method of, for cutting down on each storage region of the RAMs 307 in FIGS. 3 and 12, associating the same edge correction table with a plurality of edge patterns to share the edge correction table will be hereinafter explained based on the first embodiment with reference to the drawings in detail.

It should be noted that since components other than the density correcting unit 403 in the present embodiment are identical to those in the first embodiment, an explanation of the identical components is omitted.

Next, by referring to FIG. 9, and FIGS. 20 to 22, the edge judgment processing performed at the edge judgment unit 402 of the edge correcting unit 310 shown in FIG. 4 and the density correcting processing performed at the density correcting unit 403 in FIG. 4 will be explained. The edge pattern used at the edge judgment unit 402 in FIG. 4 and the edge correction table used in the density correcting unit 403 will be in detail explained.

FIG. 20 is a diagram showing an example of edge correction tables according to the third embodiment.

Figure 21:
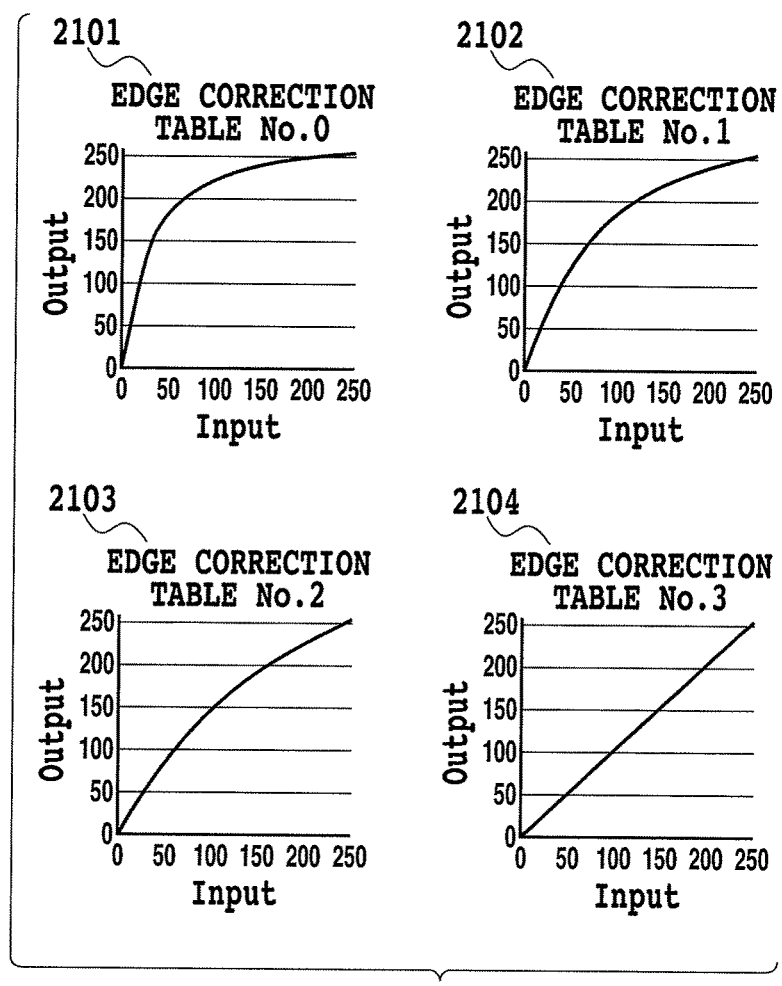
FIG. 21 is a diagram showing an example of an input/output characteristic in the edge correction table according to the third embodiment.

FIG. 21 is a diagram showing an example of an input/output characteristic in each of edge correction tables with a graph of two axes.

FIG. 22 is a diagram showing an example of an edge table for associating edge patterns with edge correction tables.

Figure 16:
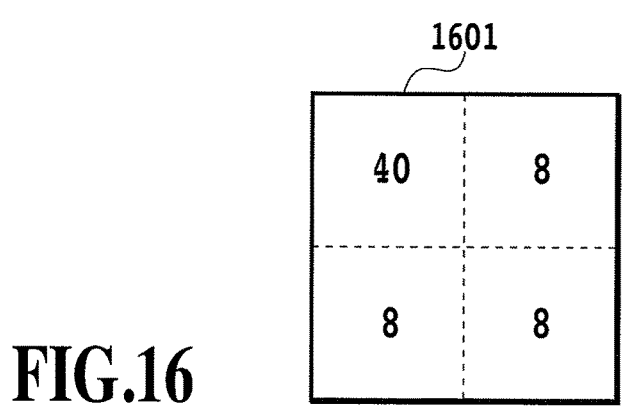
FIG. 16 is a diagram showing an example of a multiply accumulation calculating coefficient according to the second embodiment.

In the present embodiment, only four types of the edge correction tables 2001 to 2004 in FIG. 20 to 16 types of the edge patterns 901 to 916 in FIG. 9 are stored in the RAM 307 in FIG. 3.

The respective input/output characteristics of the edge correction tables 2001 to 2004 in FIG. 20 are shown in the graphs 2101 to 2104.

The edge patterns 901 to 916 in FIG. 9 respectively have the edge numbers of 0 to 15. On the other hand, the edge correction tables 2001 to 2004 in FIG. 20 respectively have the edge correction table numbers of 0 to 3. This respect differs from the first embodiment and the second embodiment.

The edge patterns 901 to 916 in FIG. 9 are made associated with the edge correction tables 2001 to 2004 in FIG. 20 10 by an edge table 2201 in FIG. 22 stored in the RAM 307 in FIG. 3 in the same way as the edge patterns and the edge correction tables.

The edge judgment unit 402 in FIG. 4 compares the processing rectangle 604 which is binarized to numeral 1 or 0 by the binarization processing unit 401 with all of the edge patterns 901 to 916 in FIG. 9 to judge whether or not each of the edge patterns 901 to 916 in FIG. 9 corresponds to the binarized processing rectangle 604 in FIG. 6. When any of the edge patterns corresponding to the processing rectangle exists, the edge number of the edge pattern is outputted to the density correcting unit 403 in FIG. 4.

The density correcting unit 403 in FIG. 4 obtains an edge correction table number from an edge table 2201 in FIG. 22 based upon an edge number outputted from the edge judgment unit 402. Further, the density correcting unit 403 in FIG. 4 makes a density correction of the image data of one pixel of 600 dpi outputted from the multiply accumulation calculating processing unit 309 in FIG. 3 using the edge correction table corresponding to the obtained edge correction table number.

As explained above, the third embodiment uses the edge table for associating the edge pattern with the edge correction table. Thereby, the third embodiment can obtain the same effect as the first embodiment and the second embodiment while cutting down on a memory amount for storing the edge density table.

<Fourth Embodiment>

The present invention may adopt an embodiment of a system, a apparatus, a method, a program, a memory medium or the like. Specially the present invention may be applied to a system constructed of a plurality of units or a device constructed of a single unit.

The present invention supplies a program of software realizing the function in the aforementioned embodiment (program corresponding to the flow chart shown in the figure in the embodiment) to the system or the device directly or from a remote location. Further, the present invention also includes a case of realizing the function of the aforementioned embodiment by reading and performing the supplied program code by a computer equipped in the system or the device.

Accordingly, the computer program itself installed in the computer for realizing the functional processing in the present invention with the computer also realizes the present invention. That is, the present invention includes also the computer program itself for realizing the functional processing in the present invention.

In this case, if equipped with the function of the program, a form such as an object code, a program performed by an interpreter, and a script data supplied to an OS may be adopted.

The print medium supplying the program includes, for example, a floppy (trade mark) disc, a hard disc, and an optical disc. Further, the print medium includes an optical magnetic disc, a MO, a CD-ROM, a CD-R, a CD-RW, a magnetic tape, an involatile memory card, a ROM, a DVD (DVD-ROM, or DVR-R) and the like.

Besides, a supply method of the program includes connecting the program to a home page in the Internet using a browser of a client computer. The program may be also supplied by downloading the computer program in the present invention from the home page to be connected or a file which is compressed and includes an automatic installation function to a print medium such as a hard disc. The supply method may be realized by dividing the program code constituting the program in the present invention into a plurality of tiles and downloading each file from different home pages. That is, the present invention includes also a WWW server for downloading the program file for realizing the functional processing in the present invention with a computer to a plurality of users.

The program in the present invention is encrypted, which is stored in a memory medium such as a CD-ROM, and the memory medium is distributed to a user. Key information for breaking the encryption is downloaded to a user meeting a predetermined condition from a home page through the Internet. The key information is used to perform the encrypted program, which is installed in the computer, realizing the function of the aforementioned embodiment.

The function in the aforementioned embodiment can be realized by performing the program read by the computer. The function in the aforementioned embodiment can be realized by performing all or a part of the actual processing with an OS working on a computer based upon an instruction of the computer program.

Further, the computer program read from the print medium is written in a memory equipped with a function expansion board inserted into the computer or a function expansion unit connected to the computer. Therefore, the function of the aforementioned embodiment can be realized also by performing all or a part of the actual processing with a CPU equipped in the function expansion board or the function expansion unit based upon an instruction of the computer program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-208597, filed Aug. 13, 2008, which is hereby incorporated by reference herein in its entirety.

What is claimed is:

1. An image forming apparatus comprising:
a resolution converting unit configured to convert high-resolution image data into low-resolution image data;
an edge judgment unit configured to judge an edge for each region composed of a plurality of pixels in the high-resolution image data; and
a density correcting unit configured to make density correction in the low-resolution image data so that the less the number of pixels having a value larger than a threshold value in a region judged as an edge by the edge judgment unit, the larger increase rate of a density in the region of the low-resolution image data corresponding to the region.

2. An image forming apparatus according to claim 1, further comprising a binarization processing unit configured to binarize the high resolution image data by comparing the pixel value of the high-resolution image data with a threshold value,
wherein the edge judgment unit judges the edge for each region composed of a plurality of pixels of the high resolution image data by using the binarized image data.

3. An image forming apparatus according to claim 1, wherein the density correcting unit makes density correction to an edge in a specific orientation in edges judged by the edge judgment unit.

4. An image forming apparatus according to claim 1, wherein the density correcting unit makes the density correction using a correction table corresponding to the number of pixels in the region judged as an edge.

5. An image forming apparatus according to claim 1, wherein the density correcting unit corrects density by using the increase rate of the density in accordance with positions of pixels having a value larger than the threshold value in the region.

6. An image forming method executed by an image forming apparatus, comprising the steps of:
converting high-resolution image data into low-resolution image data;
judging an edge for each region composed of a plurality of pixels in the high-resolution image data; and
making density correction in the low-resolution image data so that the less the number of pixels having a value larger than a threshold value in a region judged as an edge by the edge judgment unit, the larger increase rate of a density in the region of the low-resolution image data corresponding to the region.

7. A computer-executable program storable in a non-transitory computer readable memory medium for performing by a computer an image forming method comprising the steps of:
converting high-resolution image data into low-resolution image data;
judging an edge for each region composed of a plurality of pixels in the high-resolution image data; and
making density correction in the low-resolution image data so that the less the number of pixels having a value larger than a threshold value in a region judged as an edge by the edge judgment unit, the larger increase rate of a density in the region of the low-resolution image data corresponding to the region.

* * * * *